(12) United States Patent
Wolf et al.

(10) Patent No.: US 7,728,072 B2
(45) Date of Patent: Jun. 1, 2010

(54) EPICHLOROHYDRIN AMINE POLYMERS USED FOR TREATING THE SURFACE OF LEATHER

(75) Inventors: Gerhard Wolf, Ketsch (DE); Stephan Hueffer, Ludwigshafen (DE); Juergen Decker, Speyer (DE); Guenter Scherr, Ludwigshafen (DE); Oliver Reese, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1152 days.

(21) Appl. No.: 10/566,375

(22) PCT Filed: Aug. 6, 2004

(86) PCT No.: PCT/EP2004/008873

§ 371 (c)(1),
(2), (4) Date: Jan. 30, 2006

(87) PCT Pub. No.: WO2005/014687

PCT Pub. Date: Feb. 17, 2005

(65) Prior Publication Data

US 2009/0094758 A1    Apr. 16, 2009

(30) Foreign Application Priority Data

Aug. 6, 2003    (DE) ................. 103 36 452

(51) Int. Cl.
*C08L 27/04*    (2006.01)
*C14C 11/00*    (2006.01)

(52) U.S. Cl. .............. 525/76; 525/50; 525/55; 525/70; 8/94.15; 8/94.1 R; 564/498

(58) Field of Classification Search ........... 526/266; 564/498; 8/94.15, 94.1 R
See application file for complete search history.

(56) References Cited

U.S. PATENT DOCUMENTS

| 3,573,095 A | 3/1971 | Stockmann et al. |
| 3,738,945 A | 6/1973 | Panzer et al. |

FOREIGN PATENT DOCUMENTS

| EP | 0 431 739 | 6/1991 |
| EP | 0 738 608 | 10/1996 |
| EP | 0 884 944 | 12/1998 |
| JP | 11277887 A | * 10/1999 |
| WO | 97/28687 | 8/1997 |

OTHER PUBLICATIONS

English machine translation of JP 11277887.*
Kurt Eitel, "Bibliothek des Leders", Das Faerben Von Leder, vol. 5, pp. 168-171.

* cited by examiner

*Primary Examiner*—Harold Y Pyon
*Assistant Examiner*—Katie Hammer
(74) *Attorney, Agent, or Firm*—Oblon, Spivak, McClelland, Maier & Neustadt, L.L.P.

(57) ABSTRACT

An epichlorohydrinamine polymer has a ratio of amine units to epichlorohydrin units of from 0.8:1.2 to 1.0:1.0, dimethylaminopropylamine and benzylamine preferably being used as amine and/or ammonium units. The novel epichlorohydrinamine polymer is used, for example, for the surface treatment of semifinished leather products and textile materials.

20 Claims, No Drawings

EPICHLOROHYDRIN AMINE POLYMERS USED FOR TREATING THE SURFACE OF LEATHER

This application is a 371 of PCT/EP2004/008873, filed Aug. 6, 2004.

The present invention relates to a process for the preparation of epichlorohydrinamine polymers and the use of these epichlorohydrinamine polymers for the surface treatment of semifinished leather products.

Epichlorohydrinamine polymers are disclosed in the prior art. For example, EP-A 0 884 944 describes antibacterial compositions which comprise an ionic polymer and a dodecylammonium salt. Examples of suitable ionic polymers are epichlorohydrinamine polymers which are obtained by reacting a halogen epoxide with an amine. The reaction products of N,N,N',N'-tetramethyl-1,2-ethanediamine or N-dimethylamine with (chloromethyl)oxirane are mentioned as particular examples of ionic polymers. The use of epichlorohydrinamine polymers for the surface treatment of semifinished leather products is mentioned in EP-A-0 884 944.

EP-B 0 738 608 relates to curable compositions which comprise a specific water-soluble high molecular weight compound having a cationic group in its main molecular chain and another specific water-soluble high molecular weight compound having crosslinkability. This curable composition which is used for the preparation of print media for inkjet systems contains, as the water-soluble high molecular weight compound, the product of an alternative addition polymerization between epichlorohydrin and a dialkylamine or dialkanolamine.

The polymers of epichlorohydrin and an amine which are described in the prior art are suitable only to a limited extent for the treatment of leather materials. The treatment of semifinished leather products is described, for example, in Bibliothek des Leders, Volume 5, Das Färben von Leder, in particular page 168 et seq. Kationische Färbereihilfsmittel, and Volume 6 Lederzurichtung—Oberflächenbehandlung des Leders.

It is an object of the present invention to provide epichlorohydrinamine polymers which are suitable for the surface treatment of semifinished leather products.

We have found that this object is achieved by a process for the preparation of aqueous solutions of epichlorohydrinamine polymers. The process comprises the following process steps:

(a) Reaction of at least two different amines with at least one epichlorohydrin derivative as an alkylating agent in water over a period which is sufficient for free alkylating agents to be no longer detectable, a reaction mixture (I) resulting;

(b) if appropriate, cooling of the reaction mixture (I) resulting from process step (a);

(c) addition of at least one acid and, if appropriate, water to this reaction mixture (I) until the pH of the reaction mixture (I) is from 4 to 10, a reaction mixture (II) resulting, and (d) if appropriate, reaction of the reaction mixture (II) with a cationizing agent.

The different amines used in process step (a) may be any desired mono-, di- or triamine or higher amine having primary or secondary amino groups.

The amines can be selected, for example, from the group consisting of monoamines, for example benzylamine;

diamines, for example bis-2-aminoethyl ether, N,N-dimethylethylenediamine, piperazine, ethylenediamine, N,N-dimethylaminopropylamine, methylbis(3-aminopropyl)amine, methylbis(2-aminoethyl)amine, N-(2-aminoethylpiperazine);

triamines, for example N-aminoethylpiperazine and dialkylenetriamines, such as diethylenetriamine and dipropylenetriamine;

tetraamines, for example triethylenetetraamine, 4,7-dimethyltriethylenetetraamine;

pentaamines, for example tetraethylenepentaamine.

Further suitable amines are methylbis(3-aminopropyl)amine, methylbis(2-aminoethyl)amine, N-(2-aminoethylpiperazine) and 4,7-dimethyltriethylenetetraamine.

In a preferred embodiment of the present invention, dimethylaminopropylamine and benzylamine are used as amines.

In the context of the present invention, epichlorohydrin derivatives which can be used in process step (a) in the novel process are preferably understood as meaning all organic compounds which contain an epoxide unit and a halogen atom and are capable of reacting with amines with crosslinking. Epichlorohydrin derivatives which are selected from the group consisting of α-epichlorohydrin, bisepoxides, bischlorohydroxy compounds and phosgene are preferably used in process step (a) of the novel process.

The ratio of amines used to epichlorohydrin derivative or derivatives used in process step (a) is preferably from 0.8:1.2 to 1.2:0.8, particularly preferably from 0.9:1.1 to 1.1:0.9, in particular from 0.92:1.08 to 1.08:0.92.

The reaction of the at least two different amines with at least the one epichlorohydrin derivative preferably takes place at from 40 to 100° C., particularly preferably from 50 to 90° C., in particular from 80 to 85° C. The duration of the reaction in process step (a) is dependent on the amines used and on the epichlorohydrin derivative or derivatives and on the respective temperature. An exact time for the reaction and process step (a) therefore cannot be stated but depends on the respective reaction system and on the reaction parameters used. In a preferred embodiment of the present invention, the reaction in process step (a) is, however, complete when a test for free alkylating agent is negative. An example of such a test which can be used for determining the end of the reaction in process step (a) of the novel process is the Preußmann test. In general, the period for the reaction in process step (a) is from 30 minutes to 4 hours.

The reaction mixture (I) resulting from process step (a) is then cooled in process step (b), if appropriate to temperatures from 0 to 40° C.

At least one acid and, if appropriate, water are then added to the reaction mixture (I) in process step (c) so that the pH of the reaction mixture is preferably from 4 to 10, particularly preferably from 6 to 8, in particular from 6.7 to 7.3. Any acid known to a person skilled in the art may be used. Expediently, however, formic acid or hydrochloric acid is used. A reaction mixture (II) results from process step (c).

The reaction mixture (II) thus obtained can finally, if appropriate, be reacted with the cationizing agent in process step (d). Examples of suitable cationizing agents are dimethyl sulfate or methyl iodide, the reaction with the cationizing agent serving substantially for fine adjustment of the properties of the epichlorohydrinamine polymer finally obtained. In the reaction with the cationizing agent, cationic groups are produced to a greater extent in the polymer. The ratio of cationizing agent to the polymer resulting from process step (c) may vary greatly and is, for example, from 0 to 1 equivalent of cationizing agent per monomer unit of the polymer.

The present invention furthermore relates to epichlorohydrinamine polymers which are obtainable by the process described above.

These epichlorohydrinamine polymers preferably have at least two general structural units (I) and (II)

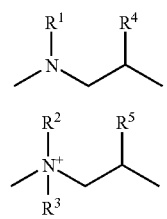

where $R^1$, $R^2$, $R^3$, $R^4$ and $R^5$ have the following meanings:

$R^1$ and $R^2$: —$(CH_2)_3N(CH_3)_2$, —$CH_2C_6H_5$, —$(CH_2)_2NH_2$, —$(CH_2)_2OH$, —$(CH_2)_2NH(CH_2)_2NH_2$ $R^3$: H, alkyl $R^4$ and $R^5$: H or OH.

The general structural units (I) and (II) are present randomly, alternately or as blocks in the epichlorohydrinamine polymer.

In the context of the present invention, a polymer is understood a meaning a substance which is composed of those molecules in which one type or a plurality of types of atoms or atom groups, for example the abovementioned general structural units (I) and (II) is arranged repeatedly in series. The number of the basic building blocks is preferably at least 3, particularly preferably at least 5, in particular at least 10. The amine and/or ammonium units of the novel epichlorohydrinamine polymers are derived from at least two different amines. The epichlorohydrin units, which are part of the novel polymer, can be derived from an epichlorohydrin derivative or a plurality of epichlorohydrin derivatives, for example two or three epichlorohydrin derivatives.

In a preferred embodiment of the present invention, the amine and/or ammonium units of the epichlorohydrinamine polymer are derived from dimethylaminopropylamine and benzylamine. It is particularly preferable if the amine and/or ammonium units are composed of from 0.5 to 0.8, preferably from 0.6 to 0.7, part of dimethylaminopropylamine and from 0.2 to 0.5, preferably from 0.3 to 0.4, part of benzylamine.

In a preferred embodiment, the novel epichlorohydrinamine polymer has a ratio of amine and/or ammonium units to epichlorohydrin units of from 0.8:1.2 to 1.2:0.8, particularly preferably from 0.9:1.1 to 1.1:0.9, in particular from 0.92:1.08 to 1.08:0.92.

The novel epichlorohydrinamine polymer preferably has a weight average molecular weight of from $1 \cdot 10^2$ to $2 \cdot 10^5$, preferably from $1 \cdot 10^3$ to $1 \cdot 10^5$, in particular from $4 \cdot 10^3$ to $5 \cdot 10^4$, g/mol. The residual monomer content is preferably less than 2% particularly preferably less than 0.1%, in particular less than 250 ppm. In addition, the viscosity of the novel epichlorohydrinamine polymer is preferably from 10 to 50, particularly preferably from 25 to 40, in particular from 28 to 35, mPa·s. The solids content of the novel epichlorohydrinamine polymer is preferably from 5 to 60, particularly preferably from 10 to 40, in particular from 20 to 25, % by weight.

The amine number of the novel epichlorohydrinamine polymer is preferably from 0.5 to 1.7, particularly preferably from 0.7 to 1.5, in particular from 1.0 to 1.2, mmol/g. The residual content of free chloride ions in the novel epichlorohydrinamine polymer is preferably from 0.5 to 2.0, particularly preferably from 0.9 to 1.5, in particular from 1.1 to 1.3, mmol/g.

If formic acid is used as the acid in process step (c), the residual proportion of formic acid in the novel epichlorohydrinamine polymer is from 0.5 to 8, particularly preferably from 1 to 5, in particular from 2 to 3, % by weight.

The present invention furthermore relates to the use of the novel epichlorohydrinamine polymers for the surface treatment of semifinished leather products.

The use of the novel epichlorohydrinamine polymer for the surface treatment of semifinished leather products is described in German Patent Application DE . . . with the title "Superficial use of cationic or amphoteric polymers on semifinished leather products", filed on the same date. The process described in this patent application and intended for the treatment of leather comprises the following process steps:

(a) Treatment of a leather with an aqueous solution of at least one novel epichlorohydrinamine polymer by roll coating and/or roll application and/or spray application and (b) treatment of the leather thus obtained with an anionic assistant in a drum.

The anionic assistant used may be, for example, a dye, a fatliquoring agent and/or a retanning agent.

For further statements in this context, reference is made to the abovementioned DE . . . .

The present invention has a large number of advantages over the prior art:

The novel epichlorohydrinamine polymers are adsorbed in a controlled manner onto the leather. For example, a dye or a fat is thus fixed very well on the leather. By using the novel epichlorohydrinamine polymers, it is therefore possible to obtain a high fastness level of the treated leather (color fastness) and at the same time to reduce the individual repair costs in comparison with the prior art. In addition, by using the novel epichlorohydrinamine polymers, the leather quality as a whole is improved, in particular with regard to levelness, depth of color and number of defects. Moreover, the novel epichlorohydrinamine polymers are also suitable for producing modifications of the leather surface. For example, regions of the leather can be colored or fatliquored by the novel epichlorohydrinamine polymers. Furthermore, the use of the novel epichlorohydrinamine polymers permits the production of printed or patterned leather. Examples of these are cloud effects or targeted irregularity on the leather.

The examples which follow illustrate the invention.

WORKING EXAMPLES a Preparation of a Novel Epichlorohydrin-dimethylaminopropylamine/benzylamine Polymer 1 020 g (10 mol) of dimethylaminopropylamine and 267.5 g (2.5 mol) of benzylamine are mixed in 1 519.1 g of water. The solution/suspension is heated to 50° C. Thereafter, 931 ml of epichlorohydrin (1 098.4 g/l 1.875 mol) are added dropwise at a rate of 16 ml/min while heating to 85° C., and stirring is effected for two hours at 85° C. The stirring at 85° C. is continued until free alkylating agent is no longer detectable (Preußmann test). The reaction mixture is cooled, diluted with 2 l of water and brought to a pH of 7.0 with 85% strength formic acid. Further water is added until the solids content is 21%.

The novel epichlorohydrinamine polymer has the following properties:

Amine number: 1.09 mmol/g,
Chloride: 1.19 mmol/g,
Bound chlorine: about 1.2 mmol/g,
Viscosity: 32 mPa·s,
Solids: 21%
Formic acid: 2.6% b Description of the Preußmann Test Using Dimethyl Sulfate as an Example

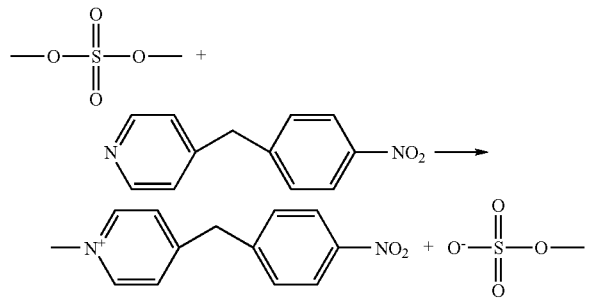

3 to 4 drops of the solution to be investigated for free alkylating agent are introduced into a test tube, 1 ml of buffer solution is added and 1 ml of Preußmann reagent is added. The resulting solution is heated to 80° C. for 30 minutes and cooled with ice water, and 1 ml of carbonate solution is added. In the presence of a free alkylating agent, the solution acquires an intensive blue color.

Buffer solution: Weigh 40.85 g of potassium hydrogen phthalate into 1 l of distilled water, add 0.4 ml of 0.2 N sodium hydroxide solution to 99.6 g of this solution and make up to 200 ml with distilled water Preußmann reagent: 4-(p-Nitrobenzyl)pyridine as a 5% strength solution in acetone Carbonate solution: Dissolve 138.21 g of potassium carbonate in 1 l of distilled water

We claim:

1. An epichlorohydrinamine polymer obtained by a process comprising:
   (a) reacting at least two different amines with at least one epichlorohydrin as an alkylating agent in water over a period which is sufficient for free alkylating agents to be no longer detectable, resulting in a reaction mixture (I);
   (b) adding at least one acid and to the reaction mixture (I) until the pH of the reaction mixture (I) is from 4 to 10, resulting in a reaction mixture (II), wherein
   the at least two different amines are selected from the group consisting of benzylamine; piperazine; methylbis(3-aminopropyl)amine; methylbis(2-aminoethyl)amine; N-(2-aminoethylpiperazine); N-aminoethylpiperazine; 4,7-dimethyltriethylenetetraamine; dimethylaminopropylamine; and
   and wherein the ratio of the at least two different amines to the at least one epichlorohydrin is from 0.8:1.2 to 1.2:0.8.

2. The epichlorohydrinamine polymer as claimed in claim 1, wherein the polymer has at least two general structural units (I) and (II) that are arranged repeatedly in series:

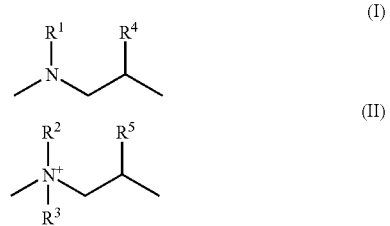

wherein
R$^1$ and R$^2$: —(CH$_2$)$_3$N(CH$_3$)$_2$, —CH$_2$C$_6$H$_5$, —(CH$_2$)$_2$NH$_2$, —(CH$_2$)$_2$OH, or —(CH$_2$)$_2$NH(CH$_2$)$_2$NH$_2$
R$^3$: H or alkyl
R$^4$ and R$^5$: H or OH.

3. The epichlorohydrinamine polymer as claimed in claim 1, wherein the at least two different amines are dimethylaminopropylamine and benzylamine.

4. The epichlorohydrinamine polymer as claimed claim 1, wherein the polymer has a weight average molecular weight of from $1 \cdot 10^2$ to $2 \cdot 10^5$ g/mol.

5. A method for the surface treatment of leather comprising treating the surface of a semi finished leather product with an epichlorohydridamine polymer according to claim 1.

6. The epichlorohydrinamine polymer as claimed claim 1, wherein the method further comprises cooling of the reaction mixture (I).

7. The epichlorohydrinamine polymer as claimed claim 1, wherein the method further comprises reacting the reaction mixture (II) with a cationizing agent, and the at least two different amines are dimethylaminopropylamine and benzylamine.

8. The epichlorohydrinamine polymer as claimed claim 1, wherein said adding further comprises adding water to the reaction mixture (I).

9. The epichlorohydrinamine polymer as claimed claim 1, wherein said at least two different amines are selected from the group consisting of methylbis(3-aminopropyl)amine; methylbis(2-aminoethyl)amine; N-(2-aminoethylpiperazine); and 4,7-dimethyltriethylenetetraamine.

10. The epichlorohydrinamine polymer as claimed claim 1, wherein the at least one epichlorohydrin is selected from the group consisting of x-epichlorohydrin, a bisepoxide, a bis-chlorohydroxy compound, and phosgene.

11. The epichlorohydrinamine polymer as claimed claim 1, wherein said reacting occurs at a temperature of from 40 to 100° C.

12. The epichlorohydrinamine polymer as claimed claim 1, wherein the ratio of the at least two different amines to the at least one epichlorohydrin is from 0.9:1.1 to 1.1:0.9.

13. The epichlorohydrinamine polymer as claimed claim 1, wherein the ratio of the at least two different amines to the at least one epichlorohydrin is from 0.92:1.08 to 1.08:0.92.

14. The epichlorohydrinamine polymer as claimed claim 1, wherein said reacting occurs at a temperature of from 50 to 90° C.

15. The epichlorohydrinamine polymer as claimed claim 1, wherein said reacting occurs at a temperature of from 80 to 85° C.

16. The epichlorohydrinamine polymer as claimed claim 1, wherein said at least one acid is formic acid or hydrochloric acid.

17. The epichlorohydrinamine polymer as claimed in claim 1, wherein the at least two amines are dimethylaminopropylamine and benzylamine and are present in relative amounts of from 0.5 to 0.8 parts and of from 0.2 to 0.5 parts, respectively.

18. The epichlorohydrinamine polymer as claimed in claim 1, wherein the at least two amines are dimethylaminopropylamine and benzylamine and are present in relative amounts of from 0.6 to 0.7 parts and of from 0.3 to 0.4 parts, respectively.

19. An epichlorohydrinamine polymer obtained by a process comprising:
   (a) reacting at least two different amines with at least one epichlorohydrin as an alkylating agent in water over a period which is sufficient for free alkylating agents to be no longer detectable, resulting in a reaction mixture (I);

(b) adding at least one acid and to the reaction mixture (I) until the pH of the reaction mixture (I) is from 4 to 10, resulting in a reaction mixture (II), wherein the at least two different amines are selected from the group consisting of benzylamine; piperazine; methylbis(3-aminopropyl)amine; methylbis(2-aminoethyl)amine; N-(2-aminoethylpiperazine); N-aminoethylpiperazine; 4,7-dimethyltriethylenetetraamine; dimethylaminopropylamine; and tetraethylenepentaamine and wherein the epichlorohydrinamine polymer has an amine number of from 0.5 to 1.7 mmol/g.

20. The epichlorohydrinamine polymer as claimed claim 19, wherein the ratio of the at least two different amines to the at least one epichlorohydrin is from 0.8:1.2 to 1.2:0.8.

* * * * *